US012076956B2

(12) United States Patent
Hagedorn et al.

(10) Patent No.: US 12,076,956 B2
(45) Date of Patent: Sep. 3, 2024

(54) PRESS TOOL AND METHOD FOR PRODUCING A PRESS TOOL

(71) Applicant: HUECK Rheinische GmbH, Viersen (DE)

(72) Inventors: Thorsten Hagedorn, Viersen (DE); Berthold Thölen, Viersen (DE)

(73) Assignee: HUECK Rheinische GmbH, Viersen (DE)

( * ) Notice: Subject to any disclaimer, the term of this patent is extended or adjusted under 35 U.S.C. 154(b) by 0 days.

(21) Appl. No.: 17/769,102

(22) PCT Filed: Oct. 12, 2020

(86) PCT No.: PCT/EP2020/078577
§ 371 (c)(1),
(2) Date: Apr. 14, 2022

(87) PCT Pub. No.: WO2021/074064
PCT Pub. Date: Apr. 22, 2021

(65) Prior Publication Data

US 2024/0109268 A1 Apr. 4, 2024

(30) Foreign Application Priority Data

Oct. 15, 2019 (DE) ......................... 102019127659.4

(51) Int. Cl.
*B30B 15/06* (2006.01)

(52) U.S. Cl.
CPC .................................. *B30B 15/062* (2013.01)

(58) Field of Classification Search
CPC ..... B30B 15/06; B30B 15/062; B30B 15/065; B30B 3/005; B30B 5/04; B29C 59/04; B29C 31/10; E04F 13/08; B32B 33/00; B32B 21/02; B44C 1/24; B44C 5/04; C09D 4/00; B44B 5/026
See application file for complete search history.

(56) References Cited

U.S. PATENT DOCUMENTS

| | | | |
|---|---|---|---|
| 10,507,475 | B2 | 12/2019 | Reichert |
| 2006/0073330 | A1 | 4/2006 | Richter |
| 2010/0068491 | A1 | 3/2010 | Richter et al. |

(Continued)

FOREIGN PATENT DOCUMENTS

| | | | |
|---|---|---|---|
| AU | 2014283868 | A1 | 2/2016 |
| AU | 2014320767 | A1 | 4/2016 |

(Continued)

OTHER PUBLICATIONS

International Search Report for International Application No. PCT/EP2020/078577 mailed Jan. 19, 2021.

*Primary Examiner* — Jimmy T Nguyen
(74) *Attorney, Agent, or Firm* — FisherBroyles, LLP

(57) ABSTRACT

The disclosure relates to a pressing tool for producing a workpiece, the pressing tool may include a base structure of metal, a pressing surface, and/or a lacquer or plastic layer. The lacquer or plastic layer may be arranged on the base structure. The lacquer or plastic layer may form, at least partially, the pressing surface. Layer mineral particles may be embedded in the lacquer or plastic layer. A method for producing a pressing tool may include coating a base structure with a lacquer or plastic layer while adding mineral particles.

12 Claims, 2 Drawing Sheets

(56) References Cited

U.S. PATENT DOCUMENTS

| | | | |
|---|---|---|---|
| 2010/0330385 | A1 | 12/2010 | Sawaguchi et al. |
| 2011/0052880 | A1 | 3/2011 | Iizuka et al. |
| 2011/0052905 | A1 | 3/2011 | Smith |

FOREIGN PATENT DOCUMENTS

| | | | | | |
|---|---|---|---|---|---|
| CA | 2455255 | A1 | | 2/2003 | |
| CA | 2751057 | A1 | | 8/2010 | |
| DE | 10124710 | A1 | | 11/2002 | |
| DE | 102006022722 | A1 | | 11/2007 | |
| DE | 202010004448 | U1 | | 6/2010 | |
| DE | 202007019068 | U1 | | 7/2010 | |
| EP | 2119550 | A1 | | 11/2009 | |
| EP | 2243864 | A1 | | 10/2010 | |
| EP | 3326834 | A1 | * | 5/2018 | |
| WO | 03016034 | A1 | | 2/2003 | |
| WO | 2004092599 | A1 | | 10/2004 | |
| WO | 2008120058 | A1 | | 9/2008 | |
| WO | 2009062488 | A2 | | 5/2009 | |
| WO | 2010088765 | A1 | | 8/2010 | |
| WO | WO-2014202041 | A1 | * | 12/2014 | .............. B22F 10/20 |
| WO | 2017081008 | A1 | | 5/2017 | |

* cited by examiner

PRESS TOOL AND METHOD FOR PRODUCING A PRESS TOOL

CROSS-REFERENCE TO RELATED APPLICATIONS

This application is a U.S. National phase based on, and claiming priority to, PCT/EP2020/078577, filed on Oct. 12, 2020, entitled "PRESS TOOL AND METHOD FOR PRODUCING A PRESS TOOL" which is based on and claims priority to German Patent Application No. DE102019127659.4, filed on Oct. 15, 2019, each of which are hereby incorporated by reference in their entirety.

BACKGROUND

The disclosure relates to a pressing tool and a method for producing a pressing tool.

Pressing tools, for example in the form of pressing plates, endless belts or embossing rollers are, for example, used in the woodworking industry, for example to produce furniture, laminates or panels, i.e. in general workpieces. The workpieces are pressed with the pressing surface of the pressing tool, such that the workpieces obtain surfaces corresponding to the pressing surface.

WO 2009/062488 A2 discloses a pressing plate with a structured pressing surface. The structured pressing surface comprises a structure that has a mountain-like surface with valleys and heights. The structured pressing surface is produced by means of deep etching and comprises a full-surface chromium layer, which is in contact with the material board during pressing.

WO 03/016034 A1 discloses a further pressing plate with a structured pressing surface. In order to reduce the wear of the pressing plate, the structured pressing surface is provided with a coating consisting of carbon with diamond-like layers and having a surface hardness of more than 1800 HV according to Vickers.

WO 2008/120058 A1 discloses a pressing tool, the pressing surface of which is formed by a layer, which consists of a metal matrix with mineral or ceramic particles embedded therein.

WO 2017/081008 A1 discloses a pressing plate made of polyether ether ketone, which has a structured pressing surface with different degrees of gloss. The polyether ether ketone is enriched with at least 10 to 50% of a carbon fiber, a graphite powder, or a thermally conductive material.

DE10124710 A1 describes a method for producing pressed laminates in a double belt press, in which, between circulatory endless belts, at least one surface of a material web is provided with an embossed structure by an embossing belt with a surface structure being guided through the press along with the material web. This embossing belt, on the one hand, has a surface structure produced by means of embossing by rolling.

US 2011/052905 describes a process for producing laminate articles comprising coating or plating the perss surfaces with a fluoro-polymer impregnated hard coating. Typical coatings that can be used with the fluoro-polymer are nickel, chromium, their combinations, and alloys thereof.

DE 20 2010 004448 U1 describes a tableting press for pressing powdered or granular materials into a tablet using a press head with a pressing surface, wherein at least a part of the pressing surface is coated with a plastic coating of a non-elastomeric plastic matrix and of a hard material particle filling embedded in the plastic matrix.

EP 2 119 550 A1 describes a shaping sheet containing a base material, on which shaping sheet at least one ink layer is provided, and a surface shaping layer formed on the ink layer, which is in contact therewith and covers the entire surface, wherein the surface shaping layer is a layer which is obtained by means of crosslinking and curing of a curable resin composition, and wherein the surface of the surface shaping layer has a convex shape and further has a concave pattern.

OVERVIEW OF THE DISCLOSURE

An object of the disclosure is to provide an improved pressing tool with a pressing surface.

Another object of the disclosure is achieved by a pressing tool for producing a workpiece, comprising a base structure of metal, a pressing surface, and a lacquer or plastic layer, which is arranged on the base structure, and which forms at least partially the pressing surface, and in which mineral particles are embedded. The lacquer or plastic layer may be a full-surface lacquer or plastic layer and forms, e.g. the entire pressing surface. The lacquer or plastic layer may be a partial lacquer or plastic layer and forms and then forms the pressing surface only partially.

A further aspect of the disclosure relates to a method for producing the pressing tool according to the disclosure, comprising a coating of the base structure with the lacquer or plastic layer while adding the mineral particles, e.g. in the form of a mineral powder.

The pressing tool according to the disclosure is, for example, an endless belt, an embossing roller or, preferably, a pressing plate and comprises the pressing surface. The pressing surface may be smooth or preferably comprise a structure of protrusions and recesses, thus be a structured pressing surface. Thereby, the workpiece receives a structured surface corresponding to the structure of the pressing surface.

The workpiece is, for example, a material board. It comprises, for example, a carrier, for example an MDF board or a chipboard, which is pressed e.g. with a resin- or plastic-coated and/or resin- or plastic-impregnated carrier, for example in the form of paper by means of the pressing tool. The material board may also be a so-called luxury vinyl tile (LVT).

The pressing tool comprises the base structure of metal, in particular of steel. If the pressing surface has the structure, the base structure is structured accordingly. The structured base structure may be produced, for example by applying masks and etching, as it is known to the person skilled in the art.

During the production of the workpiece, the pressing surface is in contact with the workpiece and is therefore exposed to wear. In order to reduce wear, the pressing surface should therefore be relatively wear resistant, which is why conventional pressing tools are coated with at least one hard chromium layer, which form the pressing surfaces. The pressing tool according to the disclosure, however, comprises the lacquer or plastic layer, in which the mineral particles are embedded. Due to the embedded mineral particles, the wear resistance of the lacquer or plastic layer is increased significantly.

The mineral particles are formed as a mineral powder, for example.

By using the lacquer or plastic layer with the mineral particles embedded therein, a chromium layer can be dispensed with, the production of which is relatively environmentally unfriendly. Thereby, the production of the pressing tool according to the disclosure is relatively environmentally friendly.

When using the pressing tool for producing the workpieces, the pressing surface and thus the lacquer or plastic layer with the mineral particles embedded therein wears off. A worn pressing tool according to the disclosure can possibly be reworked relatively easily, as it is potentially possible to remove the worn lacquer or plastic layer with the mineral particles embedded therein relatively easily and to replace it with a new lacquer or plastic layer with mineral particles embedded therein.

Minerals are, in particular, mostly inorganic, homogeneous, mostly crystalline substances occurring in the earth's crust. The plurality of the minerals known today and recognized as distinct by the International Mineralogical Association are inorganic.

The mineral particles of the lacquer or plastic layer in particular have a Mohs hardness of at least 8.

According to an embodiment of the pressing tool according to the disclosure, the mineral particles have a size in the nanometer or micrometer range. Thus, the mineral particles can be embedded in the lacquer or plastic layer relatively homogeneously, whereby it obtains a relatively homogeneous hardness across its entire surface. The sizes of the individual mineral particles may be different or essentially the same.

The mineral particles preferably have a volume share of at least 50% with regard to the volume of the lacquer or plastic layer with mineral particles embedded therein. Due to the size, the volume share, and the type of the minerals of the mineral particles, the desired degree of hardness of the lacquer or plastic layer with mineral particles embedded therein can be adjusted.

In particular, the mineral particles are diamond particles. The diamond particles are in particular industrial diamond particles, i.e. the diamond particles and/or the mineral particles in general can be produced artificially. However, in particular the minerals silicon carbide, boron nitride, boron carbide, aluminum oxide, and titanium oxide may also be used as mineral particles.

The mineral particles are formed, for example as a mineral powder, in particular a diamond powder and preferably as an industrial diamond powder.

The plastic layer preferably comprises polyether ether ketone or consists of polyether ether ketone.

The pressing surface preferably comprises the structure of protrusions and recesses, so that the base structure is structured in accordance with the structure of the pressing surface.

The base structure, in particular the structured base structure, may be treated before arranging and/or coating the base structure with the lacquer or plastic layer, so that preferably, the lacquer or plastic layer adheres better to the base structure. This treatment may be a mechanical treatment of the base structure, due to which e.g. the surface of the base structure is, for example, roughened, such that the lacquer or plastic layer adheres better to the base structure. The treatment of the base structure may comprise a galvanic and/or chemical treatment of the base structure and/or the treatment of the base structure with the aid of a laser. Due to the treatment of the base structure, for example the structure of the base structure can be refined.

According to a variant of the pressing tool according to the disclosure, the lacquer or plastic layer with the embedded mineral particles is a partial lacquer or plastic layer with the mineral particles embedded therein, which layer is arranged only in predetermined regions. The wear of the pressing tool and/or its pressing surface is particularly pronounced in the regions of the protrusions, at least in regions of certain protrusions. Therefore, the lacquer or plastic layer with the mineral particles embedded therein is preferably a partial lacquer or plastic layer with the mineral particles embedded therein, which is arranged on the base structure only in predetermined regions, which are assigned to the protrusions or predetermined protrusions of the pressing surface.

The production of this variant of the pressing tool preferably comprises a partial coating of the base structure with the lacquer or plastic layer while adding the mineral particles.

This variant of the pressing tool may particularly be produced dependent on image data assigned to the structure of the pressing surface, meaning that the production of this variant of the pressing tool preferably comprises a partial coating of the base structure with the lacquer or plastic layer while adding the mineral particles dependent on image data assigned to the structure of the pressing surface.

The pressing surface is, in particular, assigned to a natural material, such as wood or stone. In order to obtain the structure of the pressing surface, it can be provided that a model, for example a piece of wood or a stone is scanned to obtain image data. This image data includes, in particular, information about the structure that the pressing surface is to have.

The image data obtained by scanning can, for example, be edited manually to obtain the image data assigned to the structure of the pressing surface.

According to an embodiment of the pressing tool according to the disclosure, it comprises a further lacquer or plastic layer formed as a full-surface lacquer or plastic layer. The lacquer or plastic layer with the embedded mineral particles then preferably is a partial lacquer or plastic layer with the embedded mineral particles, wherein the full-surface lacquer or plastic layer is arranged between the base structure and the partial lacquer or plastic layer. In particular, the full-surface lacquer or plastic layer is arranged directly on the base structure, and the partial lacquer or plastic layer is arranged directly on the full-surface lacquer or plastic layer. Preferably, the partial lacquer or plastic layer with the mineral particles embedded therein is arranged on the full-surface lacquer or plastic layer only in predetermined regions, which are preferably assigned to the protrusions or predetermined protrusions of the pressing surface.

The partial lacquer or plastic layer and regions of the full-surface lacquer or plastic layer free of the partial lacquer or plastic layer in particular form the pressing surface.

The production of this variant of the pressing tool preferably comprises a full-surface coating of the base structure with the further and/or the full-surface lacquer or plastic layer, in particular while adding further mineral particles, and a partial coating of the full-surface lacquer or plastic layer with the partial lacquer or plastic layer while adding the mineral particles.

The partial coating is preferably carried out dependent on image data assigned to the structure of the pressing surface.

The full-surface lacquer or plastic layer and the partial lacquer or plastic layer each have degrees of gloss. These two degrees of gloss are preferably different, so that the surface of the workpiece produced using the pressing tool also has regions of different degrees of gloss.

The different degrees of gloss of the lacquer or plastic layers may be obtained, for example by hardening the lacquer or plastic layers, for example by means of UV irradiation, electron beam or laser hardening, or by exposure to different temperatures.

In order to further increase the wear resistance of the pressing surface, further mineral particles are embedded in the further and/or the full-surface lacquer or plastic layer according to a further embodiment of the pressing tool according to the disclosure. The production of this variant of the pressing tool preferably comprises a full-surface coating of the base structure with the further lacquer or plastic layer while adding further mineral particles.

The mineral particles and the further mineral particles may have the same size, the same volume share with regard to the volume of its layer and/or the same type of minerals.

The further mineral particles are in particular diamond particles, preferably industrial diamonds. However, in particular the minerals silicon carbide, boron nitride, boron carbide, aluminum oxide, and titanium oxide may also be used as mineral particles. The further mineral particles and/or diamond particles are in particular formed as a further mineral or diamond powder.

As mentioned before, the lacquer or plastic layer wears off over time. According to a variant of the pressing tool according to the disclosure, the pressing tool comprises an indicator layer for making this wear visible relatively easily, which is arranged under the lacquer or plastic layer and/or under the further lacquer or plastic layer. The indicator layer is provided to indicate wear of the lacquer or plastic layer arranged on the indicator layer, thus in particular also wear of the pressing surface. For this reason, the indicator layer has a different optical property than the lacquer or plastic layer and/or the further lacquer or plastic layer. If the lacquer or plastic layer and/or the further lacquer or plastic layer is at least partially worn so severely that it is completely removed at least in some regions, the indicator layer is visible in those regions. Due to the different optical properties, it then becomes visible to the human eye, so that a person can discern relatively easily when the pressing tool is worn too severely.

The production of this variant of the pressing tool preferably comprises arranging the indicator layer on the base structure, in particular coating the base structure with the indicator layer and coating the indicator layer with the lacquer or plastic layer and/or the further lacquer or plastic layer.

The base structure, in particular the structured base structure, may be treated before arranging and/or coating the base structure with the indicator layer, so that preferably, the indicator layer adheres better to the base structure. This treatment may be a mechanical treatment of the base structure, due to which e.g. the surface of the base structure is, for example, roughened, such that the indicator layer adheres better to the base structure. The treatment of the base structure may comprise a galvanic and/or chemical treatment of the base structure and/or the treatment of the base structure with the aid of a laser. Due to the treatment of the base structure, for example the structure of the base structure can be refined.

The indicator layer is, for example, a lacquer indicator layer, the optical property of which is different from the optical property of the lacquer or plastic layer and/or the further lacquer or plastic layer. The optical property is, for example, a color and/or a fluorescence.

According to an embodiment, particles having optical properties are embedded in the indicator layer, so that the indicator layer has a corresponding optical property which is different from the optical property of the lacquer or plastic layer and/or the further lacquer or plastic layer.

The optical properties of the indicator layer of this variant are obtained by means of the particles embedded therein. The optical properties are, for example, a color or a fluorescence. The particles of the indicator layer are therefore e.g. color particles, so that the indicator layer has a corresponding color, and/or fluorescent particles, so that the indicator layer has fluorescent properties. The particles of the indicator layer may also be mineral particles, in particular mineral color particles and/or diamond color particles, preferably industrial diamond color particles.

The particles of the indicator layer in particular have a size in the micrometer or nanometer range.

The production of this variant of the pressing tool comprises, for example, arranging the indicator layer on the base structure, in particular coating the base structure with the indicator layer in particular while adding particles, and coating the indicator layer with the lacquer or plastic layer while adding mineral particles.

The production of this variant of the pressing tool in particular comprises arranging the indicator layer on the base structure, in particular coating the base structure with the indicator layer in particular while adding the particles, full-surface coating of the indicator layer with the further lacquer or plastic layer in particular while adding the further mineral particles, and partial coating of the full-surface lacquer or plastic layer with the partial lacquer or plastic layer while adding the mineral particles, in particular dependent on image data assigned to the structure of the pressing surface.

The indicator layer may be made, for example, from metal or plastic or be a lacquer indicator layer. In particular the embodiment made from metal with particles embedded therein results in a relatively long-lasting pressing tool. The indicator layer made of metal may be applied to the base structure for example by means of a galvanic or chemical method. The metal of this indicator layer is preferably chromium-free, in particular of nickel or copper, whereby the pressing tool according to the disclosure can be produced in a relatively environmentally friendly manner.

The coating operation with the lacquer or plastic layer and/or the further lacquer or plastic layer or with the indicator layer may be, for example, a lacquering operation, a printing operation, in particular by means of digital printing, or a powder-coating operation.

The pressing surface, i.e. the lacquer or plastic layer and/or the further lacquer or plastic layer may also be conclusively processed using a laser.

BRIEF DESCRIPTION OF THE DRAWINGS

Exemplary embodiments of the disclosure are shown in the enclosed schematic figures by way of example. These show.

DETAILED DESCRIPTION

Figure 1:
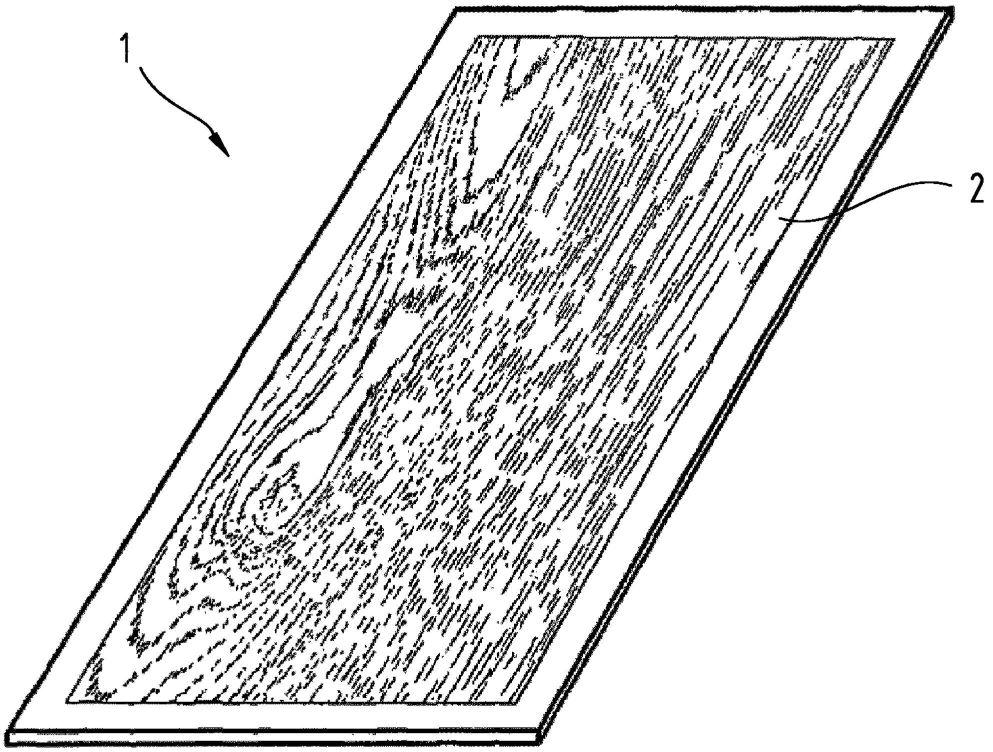
FIG. 1 a pressing plate with a pressing surface in a perspective representation, FIG. 2 a cutout from a lateral view of a first exemplary embodiment of the pressing plate in a sectional representation, and FIG. 3 a cutout from a lateral view of a second exemplary embodiment of the pressing plate in a sectional representation.

FIG. 1 shows, in a perspective representation, a pressing plate 1 with a pressing surface 2 as an example of a pressing tool.

Figure 2:
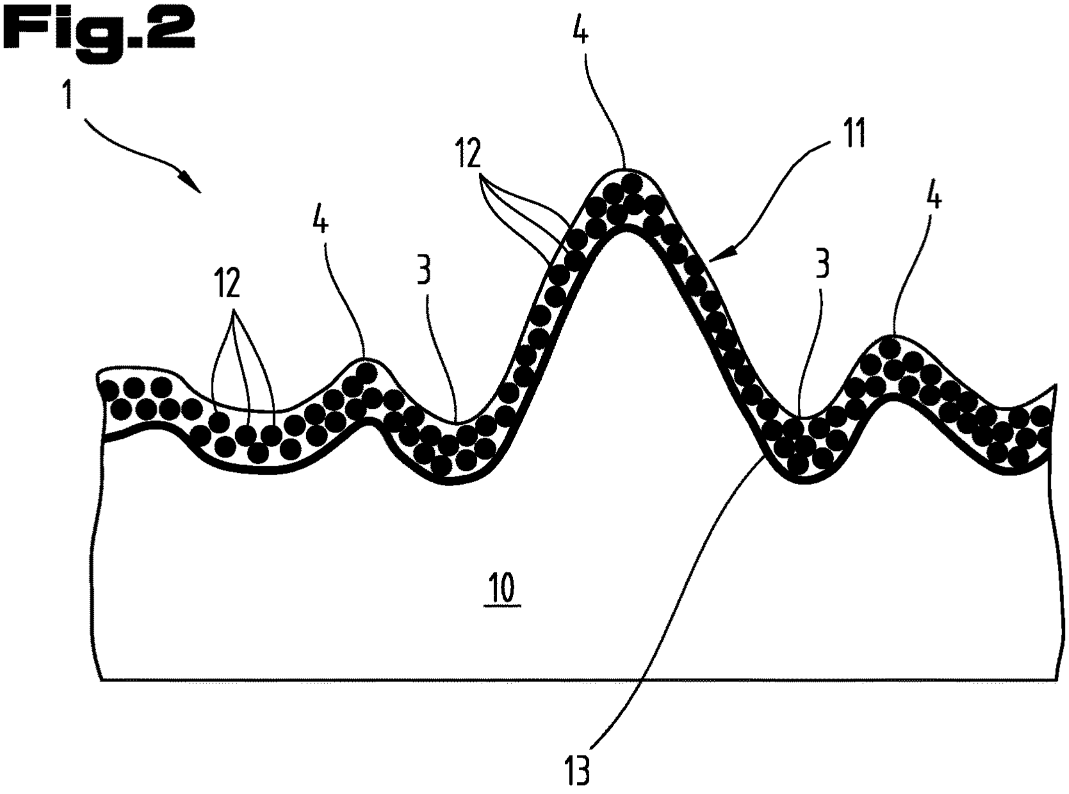
Figure 3:
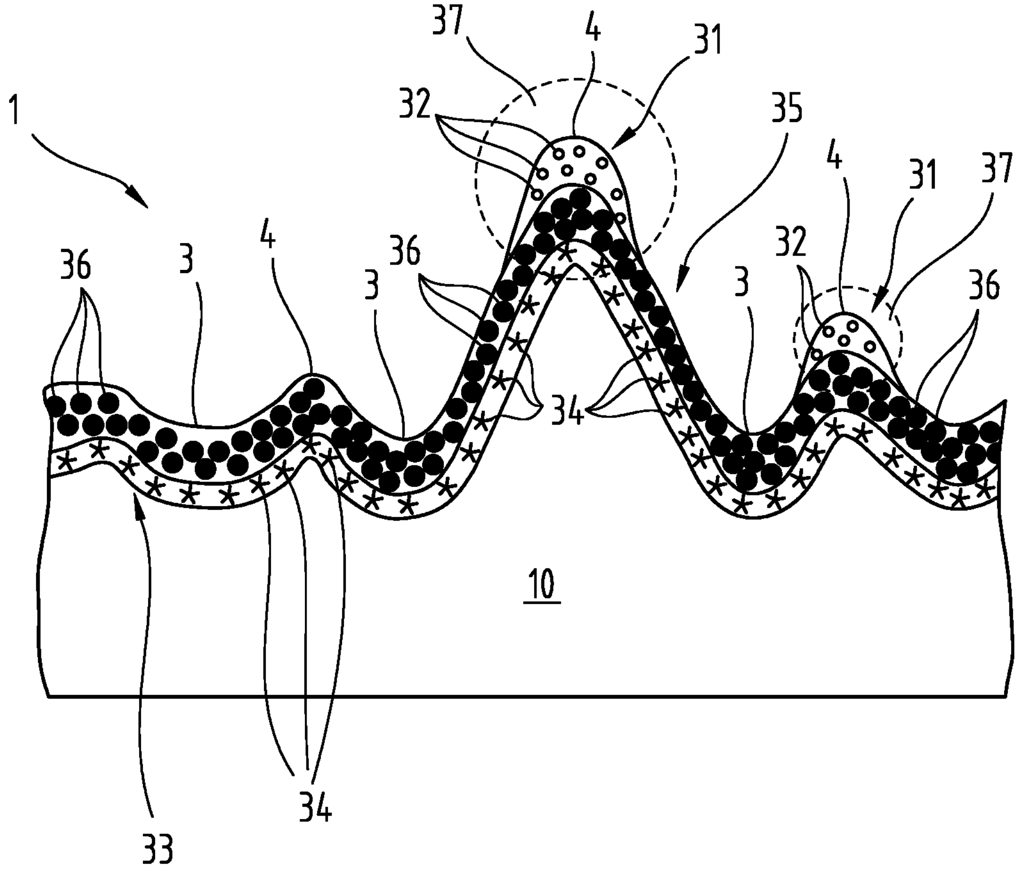

FIGS. 2 and 3 each show a cutout from a lateral view of two exemplary embodiments of the pressing plate 1 in sectional representations.

The pressing plate 1 comprises a base structure 10 of metal, and in the case of the present exemplary embodiments, the pressing surface 2 has a structure made up of recesses 3 and protrusions 4, such that the base structure 10 is structured in accordance with the structure of the pressing surface 2. The pressing surface 2 is assigned, for example, to a wood grain.

The base structure 10 is preferably made of steel and was produced for example by means of deep etching.

By the pressing plate 1, a workpiece, e.g. a pressing plate, for example a laminate, can be produced by pressing. After pressing, the workpiece has a surface structured correspondingly to the structure of the pressing surface 2.

In the case of the first exemplary embodiment shown in FIG. 2, the pressing plate 1 comprises a lacquer or plastic layer 11, in which mineral particles 12 are embedded, arranged on the base structure 10. The lacquer or plastic layer 11 may be a partial or a full-surface lacquer or plastic layer.

The mineral particles 12 are, in particular, diamond particles and have a size in the nanometer or micrometer range. The sizes of the individual mineral particles 12 may be different or essentially the same.

The mineral particles 12 preferably have a volume share of at least 50% with regard to the volume of the lacquer or plastic layer 11 with mineral particles 12 embedded therein.

If the lacquer or plastic layer 11 is a plastic layer, it preferably comprises polyether ether ketone or consists of polyether ether ketone.

The pressing tool 1 of the first exemplary embodiment, for example, was produced by coating the base structure 10 with the lacquer or plastic layer 11 while adding the mineral particles 12. This was carried out, for example by means of lacquering, printing, or powder-coating.

The lacquer or plastic layer 11 may be arranged directly on the base structure 10. The first exemplary embodiment shown in FIG. 2, however, comprises an indicator layer 13, which in the case of the present exemplary embodiment, is arranged directly on the base structure 10. On the indicator layer 13, in turn, the lacquer or plastic layer 11 is directly arranged.

The indicator layer 13 has a different optical property than the lacquer or plastic layer 11. If the lacquer or plastic layer 11 is at least partially worn so severely that it is completely removed at least in some regions, the indicator layer 13 is visible in those regions.

The production of the pressing plate 1 according to the first exemplary embodiment preferably comprises coating the base structure 10 with the indicator layer 13 and subsequently coating the indicator layer 13 with the lacquer or plastic layer 11. In the case of the first exemplary embodiment, the indicator layer 13 is a colored lacquer layer, which is possibly fluorescent.

If the lacquer or plastic layer 11 is a partial lacquer or plastic layer, it is arranged directly on the base structure 10 or direction on the indicator layer 13 particularly only in regions assigned to the protrusions 4 or specific protrusions 4 of the pressing surface 2, for example by means of coating.

The base structure 10 may be treated prior to coating the base structure 10 with the indicator layer 13, such that, for example, the indicator layer 13 adheres better to the base structure 10. This treatment may comprise a mechanical treatment and/or a galvanic and/or chemical treatment of the base structure 10 and/or the treatment of the base structure 10 with the aid of a laser.

In the case of the second exemplary embodiment of the pressing plate 1 shown in FIG. 3, it comprises a partial lacquer or plastic layer 31, in which mineral particles 32 are embedded.

The mineral particles 32 are, in particular, diamond particles and have a size in the nanometer or micrometer range. The sizes of the individual mineral particles 32 may be different or essentially the same.

The mineral particles 32 preferably have a volume share of at least 50% with regard to the volume of the partial lacquer or plastic layer 31 with mineral particles 32 embedded therein.

If the partial lacquer or plastic layer 31 is a plastic layer, it preferably comprises polyether ether ketone or consists of polyether ether ketone.

The pressing plate 1 of the second exemplary embodiment comprises a further lacquer or plastic layer, which is formed as a full-surface lacquer or plastic layer 35. In the full-surface lacquer or plastic layer 35, further mineral particles 36 may be embedded, as it is shown in FIG. 3. The further mineral particles 36 are in particular further diamond particles with a size in the micro- or nano-range.

The full-surface lacquer or plastic layer 35 may be arranged directly on the base structure 10. The second exemplary embodiment of the pressing plate 1 shown in FIG. 3, however, comprises an indicator layer 33, which in the case of the present exemplary embodiment, is arranged directly on the base structure 10. On the indicator layer 33, in turn, the full-surface lacquer or plastic layer 11 is directly arranged.

In the case of the second exemplary embodiment, the indicator layer 33 is a lacquer or plastic layer or preferably a metal layer, in which particles 34 having optical properties are embedded, so that the indicator layer 33 has a corresponding optical property, which is different from the optical property of the partial lacquer or plastic layer 32 and/or the full-surface lacquer or plastic layer 35. The particles 34 may be mineral particles, in particular diamond particles.

The particles 34 of the indicator layer 33 are e.g. color particles, so that the indicator layer 33 has a corresponding color, and/or fluorescent particles, so that the indicator layer 33 has fluorescent properties.

In the case of the second exemplary embodiment, the partial lacquer or plastic layer 31 with the mineral particles 32 embedded therein is arranged on the base structure 10, in particular directly on the full-surface lacquer or plastic layer 35 only in predetermined regions 37, which are assigned to the protrusions 4 or predetermined protrusions 4 of the pressing surface 2.

The pressing plate 1 according to the second exemplary embodiment was produced in particular dependent on image data assigned to the structure of the pressing surface 1.

The pressing surface 2 is, in particular, assigned to a natural material, such as wood or stone. In order to obtain the structure of the pressing surface 2, it can be provided that a model, for example a piece of wood is scanned to obtain image data. This image data includes, in particular, information about the structure that the pressing surface is to have.

The image data obtained by scanning can, for example, be edited manually to obtain the image data assigned to the structure of the pressing surface 2.

The pressing plate 1 of the second exemplary embodiment was produced, for example by applying the indicator layer

33 to the base structure 10 using a chemical or a galvanic method while adding the particles 34.

Subsequently, the indicator layer 33 was coated with the full-surface lacquer or plastic layer 35 while adding the further mineral particles 36. This coating operation particularly also comprises hardening the full-surface lacquer or plastic layer 35, for example by UV irradiation or by electron beam or laser hardening.

Subsequently, the full-surface lacquer or plastic layer 35 was coated with the partial lacquer or plastic layer 31 while adding the mineral particles 32, dependent on image data assigned to the structure of the pressing surface 1. This coating operation particularly also comprises hardening the partial lacquer or plastic layer 31, for example by UV irradiation or by electron beam or laser hardening.

The full-surface lacquer or plastic layer 35 and the partial lacquer or plastic layer 31 each have degrees of gloss. These two degrees of gloss are preferably different, so that the surface of the workpiece produced using the pressing plate 1 also has regions of different degrees of gloss.

The different degrees of gloss of the full-surface and the partial lacquer or plastic layers 35, 31 may be obtained, for example by different hardening or by exposure to different temperatures.

The invention claimed is:

1. A pressing tool for producing a workpiece, comprising:

a base structure of metal;

a pressing surface; and a full surface lacquer or plastic layer, which is extended along the base structure, the full surface lacquer or plastic layer forms the pressing surface, and mineral particles are embedded in the full surface lacquer or plastic layer;

wherein the pressing surface has a structure of protrusions and recesses, the base structure is structured in accordance with the structure of the pressing surface, and a partial lacquer or plastic layer with embedded mineral particles is arranged on top of the full surface lacquer or plastic layer only in predetermined regions, the predetermined regions are assigned to the protrusions or predetermined protrusions of the pressing surface.

2. The pressing tool according to claim 1, wherein the full-surface lacquer or plastic layer is arranged between the base structure and the partial lacquer or plastic layer.

3. The pressing tool according to claim 2, wherein the full-surface lacquer or plastic layer has a degree of gloss, and the partial lacquer or plastic layer has a degree of gloss different from the degree of gloss of the full-surface lacquer or plastic layer, and/or wherein further mineral particles are embedded in the full-surface lacquer or plastic layer.

4. The pressing tool according to claim 1, wherein the mineral particles have a Mohs hardness of at least 8 and/or are diamond particles and/or have a size in a nanometer or micrometer range and/or have a volume share of at least 50% with regard to a volume of the full surface lacquer or plastic layer with mineral particles embedded therein.

5. The pressing tool according to claim 1, further comprising an indicator layer which is arranged under the full surface lacquer or plastic layer and has an optical property which is different from an optical property of the full surface lacquer or plastic layer.

6. The pressing tool according to claim 5, wherein the indicator layer is made from metal or from plastic or is a lacquer indicator layer, and/or wherein particles having optical properties are embedded in the indicator layer, so that the indicator layer has a corresponding optical property, which is different from the optical property of the full surface lacquer or plastic layer.

7. The pressing tool according to claim 6, wherein the particles have a size in a micrometer or nanometer range, and/or the particles are color particles, so that the indicator layer has a corresponding color, and/or the particles are fluorescent particles, so that the indicator layer has fluorescent properties, and/or wherein the particles are mineral particles.

8. A method for producing a pressing tool, comprising:

providing a base structure of metal and a pressing surface; and coating the base structure with a full surface lacquer or plastic layer while adding mineral particles to the full surface lacquer or plastic layer to form the pressing surface;

wherein the pressing surface has a structure of protrusions and recesses, the base structure is configured in accordance with a configuration of the pressing surface, and a partial lacquer or plastic layer with mineral particles, partially coating with the partial lacquer or plastic layer while adding the mineral particles dependent on image data assigned to the structure of the pressing surface, so that the partial lacquer or plastic layer is arranged on top of the full surface lacquer or plastic layer only in predetermined regions, the predetermined regions are assigned to the protrusions or specific protrusions of the pressing surface.

9. The method according to claim 8, wherein the full surface lacquer or plastic layer is arranged between the base structure and the partial lacquer or plastic layer.

10. The method for producing a pressing tool according to claim 8, further comprising coating the base structure with an indicator layer and coating the indicator layer with the full surface lacquer or plastic layer while adding the mineral particles.

11. The method according to claim 10, further comprising arranging the indicator layer on the base structure.

12. The method according to claim 10 further comprising:

a) prior to coating the full-surface lacquer or plastic layer with the partial lacquer or plastic layer, hardening the full-surface lacquer or plastic layer, so that it has a degree of gloss; and b) hardening the partial lacquer or plastic layer, so that it has a degree of gloss which is different from the degree of gloss of the full-surface lacquer or plastic layer.

* * * * *